United States Patent [19]

Jorgensen et al.

[11] 4,349,648

[45] Sep. 14, 1982

[54] CATALYST COMPOSITION FOR COPOLYMERIZING ETHYLENE

[75] Inventors: Robert J. Jorgensen, Dunbar, W. Va.; George L. Goeke; Frederick J. Karol, both of Belle Mead, N.J.

[73] Assignee: Union Carbide Corporation, Danbury, Conn.

[21] Appl. No.: 288,806

[22] Filed: Jul. 31, 1981

[51] Int. Cl.³ .......................... C08F 2/34; C08F 10/02
[52] U.S. Cl. ................................ 526/125; 252/429 B; 252/429 C; 526/348.6; 526/901
[58] Field of Search ......................................... 526/125

[56] References Cited

U.S. PATENT DOCUMENTS

| | | | |
|---|---|---|---|
| 4,064,334 | 12/1977 | Kuroda et al. | 526/125 |
| 4,174,429 | 11/1979 | Giannini et al. | 526/125 |
| 4,205,021 | 5/1980 | Morita et al. | |
| 4,234,710 | 11/1980 | Moberly et al. | 526/125 |

FOREIGN PATENT DOCUMENTS

| | | |
|---|---|---|
| 4647 | 10/1979 | European Pat. Off. . |
| 4651 | 10/1979 | European Pat. Off. ............ 526/125 |
| 1355245 | 6/1974 | United Kingdom . |

*Primary Examiner*—Edward J. Smith
*Attorney, Agent, or Firm*—John S. Piscitello

[57] ABSTRACT

Ethylene copolymers having improved optical properties in film form are prepared by continuously copolymerizing ethylene with one or more higher alpha olefin monomers in a low pressure gas phase reaction with a catalyst composition prepared by forming a precursor composition from a magnesium compound, titanium compound, and electron donor compound; diluting said precursor composition with an inert carrier material; optionally partially activating the diluted precursor composition with an organo aluminum compound prior to introducing said diluted precursor composition into the polymerization reactor; and completely activating the diluted (and optionally partially activated) precursor composition in the polymerization reactor with a mixture of a dihydrocarbyl aluminum halide compound and a trihydrocarbyl aluminum compound.

18 Claims, 1 Drawing Figure

CATALYST COMPOSITION FOR COPOLYMERIZING ETHYLENE

FIELD OF THE INVENTION

This invention relates to a process for copolymerizing ethylene with other alpha olefins to produce copolymers which are characterized by improved optical properties in film form.

BACKGROUND OF THE INVENTION

Ethylene copolymers having highly desirable optical properties in film form can be prepared, as described in European patent publication No. 4647, by continuously copolymerizing ethylene with one or more higher alpha olefin monomers via a low pressure gas phase reaction with a catalyst composition prepared by (1) forming a precursor composition from a magnesium compound, titanium compound and electron donor compound, (2) impregnating said precursor composition in a particulate, inert, porous support, and (3) activating the precursor composition with an organo aluminum compound. While films blown from such copolymers have excellent clarity, as measured by haze and gloss determinations on such films, it would be desirable to upgrade the clarity of such films even further in order to render them useful in certain applications where even better haze and gloss properties are desirable, e.g., where the films are to be employed for packaging and/or are to contain printed material.

SUMMARY OF THE INVENTION

In accordance with the present invention, it has now been discovered that ethylene copolymers having improved optical properties in film form can be prepared by continuously copolymerizing ethylene with one or more higher alpha olefin monomers in a low pressure gas phase reaction with a catalyst composition prepared by forming a precursor composition from a magnesium compound, titanium compound, and electron donor compound; diluting said precursor composition with an inert carrier material; optionally partially activating the diluted precursor composition with an organo aluminum compound prior to introducing said diluted precursor composition into the polymerization reactor; and completely activating the diluted (and optionally partially activated) precursor composition in the polymerization reactor with a mixture of a dihydrocarbyl aluminum halide compound and a trihydrocarbyl aluminum compound.

DESCRIPTION OF THE PREFERRED EMBODIMENTS

In addition to being processable into films having improved optical properties, the copolymers produced in accordance with the present invention are characterized by excellent mechanical properties as well. In order to obtain films having the desired improvement in optical properties, however, it is essential that the catalyst composition employed in the production of such copolymers be activated as described herein with a mixture of a dihydrocarbyl aluminum halide compound and a trihydrocarbyl aluminum compound.

The Ethylene Polymers

When prepared under the conditions described below, films blown from ethylene copolymers produced in accordance with the present invention are characterized by a haze value no greater than 16 percent, usually from 7 percent to 12 percent, and a 45° D specular gloss of at least 45, usually from 54 to 72. Such films have been found to have a gloss/haze ratio of at least 3, usually from 5 to 10.

The ethylene copolymers produced with the catalyst compositions of the present invention have a density of from about 0.91 g/cm$^3$ to about 0.94 g/cm$^3$, preferably from 0.916 g/cm$^3$ to 0.925 g/cm$^3$. At a given melt index, the density of the copolymers is primarily regulated by the amount of comonomer which is copolymerized with the ethylene. In the absence of comonomer, ethylene polymerizes to form homopolymers having a density of at least about 0.96 g/cm$^3$. By the addition of progressively larger amounts of comonomer, copolymers having a progressively lower density are obtained. The amount of comonomer needed to achieve the same result will vary from comonomer to comonomer, under the same conditions. Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The copolymers produced with the catalyst compositions of the present invention are copolymers of a major mol percent (at least 90%) of ethylene and a minor mol percent (no more than 10%) of one or more alpha olefins containing from 3 to 8 carbon atoms. These alpha olefins, which should not contain any branching on any of their carbon atoms which is closer than the fourth carbon atom, include propylene, butene-1, pentene-1, hexene-1, 4-methylpentene-1, heptene-1 and octene-1. The preferred alpha olefins are propylene, butene-1, hexene-1, 4-methylpentene-1 and octene-1.

The copolymers produced with the catalyst compositions of the present invention have a standard or normal load melt index of from about 0.5 g/10 minutes to about 5.0 g/10 minutes, preferably of from about 0.8 g/10 minutes to about 4.0 g/10 minutes, and a high load melt index (HLMI) of from about 11 g/10 minutes to about 2000 g/10 minutes. The melt index of a polymer varies inversely with its molecular weight and is a function of the polymerization temperature of the reaction, the density of the polymer, and the hydrogen/monomer ratio in the reaction system. Thus, the melt index is raised by increasing the polymerization temperature, by decreasing the density of the polymer, and/or by increasing the hydrogen/monomer ratio. In addition to hydrogen, other chain transfer agents may also be used to further increase the melt index of the polymers.

The ethylene copolymers produced with the catalyst compositions of the present invention have a melt flow ratio (MFR) of from about 22 to about 32, preferably of from about 25 to about 30. Melt flow ratio is another means of indicating the molecular weight distribution (Mw/Mn) of a polymer. An MFR in the range of from about 22 to about 32 corresponds to a Mw/Mn of from about 2.7 to about 4.1, and an MFR in the range of from about 25 to about 30 corresponds to a Mw/Mn of from about 2.8 to about 3.6.

The copolymers produced with the catalyst compositions of the present invention have a residual catalyst content, in terms of parts per million of titanium metal, of less than 10 parts per million (ppm) at a productivity level of at least 100,000 pounds of polymer per pound of titanium. The copolymers are readily produced with such catalyst compositions at productivities of up to about 500,000 pounds of polymer per pound of titanium.

The copolymers produced with the catalyst compositions of the present invention are granular materials having an average particle size of the order of from about 0.02 to about 0.05 inches, usually of from about 0.02 to about 0.04 inches, in diameter. The particle size is important for the purpose of readily fluidizing the polymer particles in the fluid bed reactor, as described below.

The copolymers produced with the catalyst compositions of the present invention have a bulk density of from about 19 to about 31 pounds per cubic foot.

The copolymers produced with the catalyst compositions of the present invention ordinarily have a terminal vinyl unsaturation no greater than 0.100 per carbon atoms, a trans-vinyl unsaturation no greater than 0.027 per 1000 carbon atoms, and a vinylidene unsaturation no greater than 0.055 per 1000 carbon atoms. Most frequently, the copolymers have a terminal vinyl unsaturation of from 0.075 to 0.090 per 1000 carbon atoms, a trans-vinyl unsaturation of from 0.020 to 0.025 per 1000 carbon atoms, and a vinylidene unsaturation of from 0.040 to 0.053 per 1000 carbon atoms.

Catalyst Preparation: Formation of Precursor

The precursor composition employed in the present invention is formed by dissolving at least one titanium compound and at least one magnesium compound in at least one electron donor compound at a temperature of from about 20° C. up to the boiling point of the electron donor compound. The titanium compound(s) can be added to the electron donor compound(s) before or after the addition of the magnesium compound(s), or concurrent therewith. The dissolution of the titanium compound(s) and the magnesium compound(s) can be facilitated by stirring, and in some instances by refluxing, these two compounds in the electron donor compound. After the titanium compound(s) and the magnesium compound(s) are dissolved, the precursor composition may be isolated by crystallization or by precipitation with an aliphatic or aromatic hydrocarbon containing from 5 to 8 carbon atoms, such as hexane, isopentane or benzene. The crystallized or precipitated precursor composition may be isolated in the form of fine, free-flowing particles having an average particle size of from about 10 microns to about 100 microns after drying at temperatures up to 60° C.

About 0.5 mol to about 56 mols, and preferably about 1 to 10 mols, of the magnesium compound(s) are used per mol of the titanium compound(s) in preparing the catalyst compositions of the present invention.

The titanium compound(s) employed in preparing the precursor composition has the structure:

$$Ti(OR)_a X_b$$

wherein

R is an aliphatic or aromatic hydrocarbon radical containing from 1 to 14 carbon atoms, or COR' where R' is an aliphatic or aromatic hydrocarbon radical containing from 1 to 14 carbon atoms, X is selected from the group consisting of Cl, Br, I, or mixtures thereof, a is 0, 1 or 2, b is 1 to 4 inclusive and a+b=3 or 4.

Suitable titanium compounds include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound(s) employed in preparing the precursor composition has the structure:

$$MgX_2$$

wherein

X is selected from the group consisting of Cl, Br, I, or mixtures thereof.

Suitable magnesium compounds include $MgCl_2$, $MgBr_2$ and $MgI_2$. Anydrous $MgCl_2$ is particularly preferred.

The electron donor compound(s) employed in preparing the precursor composition is an organic compound which is liquid at 25° C. and in which the titanium and magnesium compounds are soluble. The electron donor compounds are known as such, or as Lewis bases.

Suitable electron donor compounds include the alkyl esters of aliphatic and aromatic carboxylic acids, aliphatic ethers, cyclic ethers and aliphatic ketones. Among these electron donor compounds the preferable ones are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbon atoms, preferably from 3 to 4 carbon atoms; cyclic ethers containing from 4 to 5 carbon atoms, preferably mono- or di-ethers containing 4 carbon atoms; and aliphatic ketones containing from 3 to 6 carbon atoms, preferably from 3 to 4 carbon atoms. The most preferred of these electron donor compounds include methyl formate, ethyl acetate, butyl acetate, ethyl ether, hexyl ether, tetrahydrofuran, dioxane, acetone and methyl ethyl ketone.

Catalyst Preparation: Dilution of Precursor With Support

The precursor composition is then diluted with an inert carrier material by (1) mechanically mixing or (2) impregnating such composition into the carrier material.

Mechanical mixing of the inert carrier and precursor composition is effected by blending these materials together using conventional techniques. The blended mixture suitably contains from about 3 percent by weight to about 50 percent by weight of the precursor composition.

Impregnation of the inert carrier material with the precursor composition may be accomplished by dissolving the precursor composition in the electron donor compound, and then admixing the support with the dissolved precursor composition to impregnate the support. The solvent is then removed by drying at temperatures up to about 85° C.

The support may also be impregnated with the precursor composition by adding the support to a solution of the chemical raw materials used to form the precursor composition in the electron donor compound, without isolating the precursor composition from said solution. The excess electron donor compound is then removed by drying at temperatures up to about 85° C.

When thus made as disclosed above the blended or impregnated precursor composition has the formula:

$$Mg_mTi(OR)_nX_p[ED]_q$$

wherein

R is an aliphatic or aromatic hydrocarbon radical containing from 1 to 14 carbon atoms, or COR' wherein R' is also an aliphatic or aromatic hydrocarbon radical containing from 1 to 14 carbon atoms, X is selected from the group consisting of Cl, Br, I, or mixtures thereof.

ED is an electron donor compound, m is 0.5 to 56, preferably 1.5 to 5, n is 0, 1 or 2, p is 2 to 116, preferably 6 to 14, and q is 2 to 85, preferably 3 to 10.

Suitably, the impregnated carrier material contains from about 3 percent by weight to about 50 percent by weight, preferably from about 10 percent by weight to about 30 percent by weight, of the precursor composition.

The carrier materials employed to dilute the precursor composition are solid, particulate, porous materials which are inert to the other components of the catalyst composition, and to the other active components of the reaction system. These carrier materials include inorganic materials such as oxides of silicon and/or aluminum. The carrier materials are used in the form of dry powders having an average particle size of from about 10 microns to about 250 microns, preferably from about 20 microns to about 150 microns. These materials are also porous and have a surface area of at least 3 square meters per gram, and preferably at least 50 square meters per gram. Catalyst activity or productivity can apparently be improved by employing a silica support having average pore sizes of at least 80 Angstrom units, preferably at least 100 Angstrom units. The carrier material should be dry, that is, free of absorbed water. Drying of the carrier material can be effected by heating, e.g., at a temperature of at least 600° C. when silica is employed as the support. Alternatively, when a silica support is employed, it may be dried at a temperature of at least 200° C. and treated with about 1 weight percent to about 8 weight percent of one or more of the aluminum activator compounds described below. Modification of the support by an aluminum compound in this manner provides the catalyst composition with increased activity and also improves polymer particle morphology of the resulting ethylene polymers. Other organometallic compounds, such as diethylzinc, may also be used to modify the support.

Activation of the Precursor Composition

To be useful in producing ethylene copolymers, the precursor composition must be activated with a compound capable of transforming the titanium atoms in the precursor composition to a state which will cause ethylene to effectively copolymerize with higher alpha olefins.

If desired, the precursor composition may be partially activated before it is introduced into the polymerization reactor by treating it with an organo aluminum compound. However, any activation undertaken outside of the polymerization reactor should be limited to the addition of an amount of activator compound which does not raise the molar ratio of activator compound:electron donor in the precursor composition beyond 1.4:1. Preferably, when activation is effected outside the reactor in this manner, the activator compound is employed in an amount which will provide the precursor composition with an activator compound:electron donor molar ratio of from about 0.1:1 to about 0.8:1. Such partial activation is preferably carried out in a hydrocarbon solvent slurry followed by drying of the resulting mixture, to remove the solvent, at temperatures of from about 20° C. to about 80° C., preferably from about 50° C. to about 70° C. The resulting product is a free-flowing solid particulate material which can be readily fed to the polymerization. reactor where the activation is completed.

The organo aluminum compounds that can be employed to partially activate the precursor composition before it is introduced into the reactor have the structure:

$$Al(R'')_dX'_eH_f$$

wherein

X' is Cl or OR''',

R'' and R''' are saturated hydrocarbon radicals containing from 1 to 14 carbon atoms, which radicals may be the same or different, e is 0 to 1.5, f is 0 or 1, and d+e+f=3.

Such activator compounds can be employed individually or in combination thereof and include compounds such as $Al(C_2H_5)_3$, $Al(C_2H_5)_2Cl$, $Al_2(C_2H_5)_3Cl_3$, $Al(C_2H_5)_2H$, $Al(C_2H_5)_2(OC_2H_5)$, $Al(i-C_4H_9)_3$, $Al(i-C_4H_9)_2H$, $Al(C_6H_{13})_3$ and $Al(C_8H_{17})_3$.

Alternatively, activation of the precursor composition may be completed entirely inside the polymerization reactor without any prior activation outside of the reactor.

In order to produce copolymers which can be processed into films having improved optical properties, it is necessary to complete the activation of the precursor composition with a mixture of a dihydrocarbyl aluminum halide compound and a trihydrocarbyl aluminum compound wherein the molar ratio of dihydrocarbyl aluminum halide compound to trihydrocarbyl aluminum compound is maintained at at least 4:1. However, this molar ratio should not be permitted to exceed 20:1 as productivity falls to unsatisfactory levels above such ratios. Preferably, the ratio is maintained within the range of from 5:1 to 15:1.

The dihydrocarbyl aluminum halide compounds employed to complete activation of the precursor composition have the structure:

$$R''_2AlX$$

wherein

R'' is a saturated hydrocarbon radical containing from 1 to 14 carbon atoms or OR''', wherein R''' is a saturated hydrocarbon radical containing from 1 to 14 carbon atoms, which radicals may be the same or different, and X is selected from the group consisting of Cl, Br, I or mixtures thereof.

Such dihydrocarbyl aluminum halide compounds can be employed individually or in combination thereof and include compounds such as $(C_2H_5)_2AlCl$, $(C_2H_5O)_2AlCl$, $(i-C_4H_9)_2AlCl$, $(i-C_4H_9O)_2AlCl$, $(C_6H_5)_2AlCl$, $(C_6H_5O)_2AlCl$, $(C_6H_{13})_2AlCl$ and $(C_6H_{13}O)_2AlCl$, and the corresponding bromine and iodine compounds.

The trihydrocarbyl aluminum compounds employed to complete activation of the precursor composition have the structure:

$$R'''_3Al$$

wherein $R'''$ is a saturated hydrocarbon radical containing from 1 to 14 carbon atoms, which radicals may be the same or different.

Such trihydrocarbyl aluminum compounds can be employed individually or in combination thereof and include compounds such as $(CH_3)_3Al$, $(C_2H_5)_3Al$, $(i-C_4H_9)_3Al$, $(C_6H_{13})_3Al$, $(C_6H_5)_3Al$ and $(C_8H_{17})_3Al$.

The partially activated or totally unactivated precursor composition is preferably fed into the reactor through a separate feed line from that employed for the dihydrocarbyl aluminum halide compound and the trihydrocarbyl aluminum compound. The latter compounds may be introduced either separately or as a mixture, provided the required molar ratio between these compounds is maintained in the reactor. Preferably they are introduced as a mixture. In any event, they are added in an amount such that together they provide, in the reactor, a total aluminum: titanium molar ratio of from about 10:1 to about 400:1, preferably from about 25:1 to about 60:1.

One convenient means of introducing the dihydrocarbyl aluminum halide compound and the trihydrocarbyl aluminum compound into the reactor is to dissolve them, either separately or together, in a hydrocarbon solvent such as isopentane, hexane or mineral oil, and then spray the solution into the reactor. Such solutions preferably contain a total of from about 2 weight percent to about 30 weight percent of these aluminum compounds.

In a continuous gas phase process, such as the fluid bed process disclosed below, discrete portions of the partially activated or totally unactivated precursor composition are continuously fed to the reactor, with discrete portions of the activator compounds needed to complete the activation of the partially activated or totally unactivated precursor composition, during the continuing polymerization process in order to replace active catalyst sites that are expanded during the course of the reaction.

The Polymerization Reaction

The polymerization reaction is conducted by contacting a stream of the monomers, in a gas phase process, such as in the fluid bed process described below, and substantially in the absence of catalyst poisons such as moisture, oxygen, carbon monoxide, carbon dioxide, and acetylene, with a catalytically effective amount of the completely activated precursor composition (the catalyst) at a temperature and at a pressure sufficient to initiate the polymerization reaction.

In order to obtain the desired copolymers, no more than 10 mol percent of any higher alpha olefin should be copolymerized with the ethylene monomer. For this reason, no more than 50 mol percent of such alpha olefin should be present in the recycled gas stream of monomers in the reactor.

Figure 1:
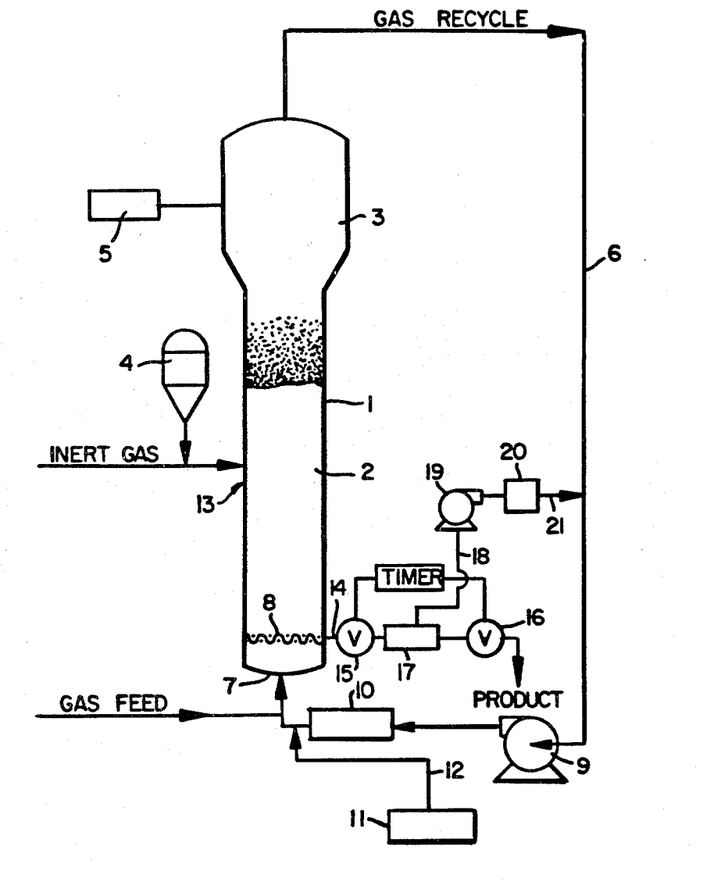
The drawing shows a gas phase fluid bed reactor system in which the catalyst system of the present invention can be employed.

A fluidized bed reaction system which can be used in the practice of the process of the present invention is illustrated in the drawing. With reference thereto the reactor 1 consists of a reaction zone 2 and a velocity reduction zone 3.

The reaction zone 2 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$, and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100-111 (1966).

It is essential that the bed always contains particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially activated or totally unactivated precursor composition used in the fluidized bed is preferably stored for service in a reservoir 4 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possibly free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 5 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned over gas recycle line 6 to the reactor at point 7 below the bed. At that point there is a gas distribution plate 8 above the point of return to aid in fluidizind the bed.

The portion of the gas stream which does not react in the bed constitutes the recycle gas which is removed from the polymerization zone, preferably by passing it into a velocity reduction zone 3 above the bed where entrained particles are given an opportunity to drop back into the bed.

The recycle gas is then compressed in a compressor 9 and then passed through a heat exchanger 10 wherein it is stripped of heat of reaction before it is returned to the bed. The temperature of the bed is controlled at an essentially constant temperature under steady state conditions by constantly removing heat of reaction. No noticeable temperature gradient appears to exist within the upper portion of the bed. A temperature gradient will exist in the bottom of the bed in a layer of about 6 to 12 inches, between the temperature of the inlet gas and the temperature of the remainder of the bed. The recycle is then returned to the reactor at its base 7 and to the fluidized bed through distribution plate 8. The compressor 9 can also be placed downstream of the heat exchanger 10.

The distribution plate 8 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization throughout the bed is, therefore, important. The distribution plate 8 serves this purpose and may be a screen, slotted plate, perforated plate, a plate of the bubble cap type and the like. The elements of the plate may all be stationary, or the plate may be of the mobile type disclosed in U.S. Pat. No. 3,298,792. Whatever its design, it must diffuse the recycle gas through the particles at the base of the bed to keep the bed in a fluidized condition, and also serve to support a quiescent bed of resin particles when the reactor is not in operation. The mobile elements of the plate may be used to dislodge any polymer particles entrapped in or on the plate.

Hydrogen is used as a chain transfer agent in the polymerization reaction of the present invention. The ratio of hydrogen/ethylene employed will vary between 0.1 to about 2.0 moles of hydrogen per mole of the monomer in the gas stream.

Any gas inert to the catalyst and reactants can also be present in the gas stream. The activator compounds are preferably added to the reaction system downstream from heat exchanger 10. Thus, the activator compounds may be fed into the gas recycle system from dispenser 11 through line 12. When the activator compounds are fed into the reaction system separately, two separate dispensers may be provided.

Compounds of the structure $Zn(R_a)(R_b)$, wherein $R_a$ and $R_b$ are the same or different aliphatic or aromatic hydrocarbon radicals containing from 1 to 14 carbon atoms, may be used in conjunction with hydrogen as molecular weight control or chain transfer agents, that is, to increase the melt index values of the polymers that are produced. From 0 to about 100, and preferably about 20 to about 30 moles of the zinc compound (as Zn) would be used in the gas stream in the reactor per mol of titanium compound (as Ti) in the reactor. The zinc compound would be introduced into the reactor, preferably in the form of a dilute solution (about 2 to about 30 weight percent) in a hydrocarbon solvent or absorbed on a solid diluent material, such as silica, in amounts of about 10 to about 50 weight percent. These compositions tend to be pyrophoric. The zinc compound may be added alone, or with any additional portions of the activator compounds that are to be added to the reactor, from a feeder, not shown, which could be positioned adjacent to dispenser 11.

It is essential to operate the fluid bed reactor at a temperature below the sintering temperature of the polymer particles to insure that sintering will not occur. To produce the desired copolymers, an operating temperature of from about 30° C. to about 105° C. is preferred, most preferably from about 75° C. to about 95° C. Temperatures of from about 75° C. to about 95° C. as used to prepare copolymers having a density of from about 0.91 g/cm$^3$ to about 0.92 g/cm$^3$, while temperatures of from about 80° C. to about 100° C. are used to prepare copolymers having a density of from about 0.92 g/cm$^3$ to about 0.94 g/cm$^3$.

The fluid bed reactor is operated at pressures of up to about 1000 psi, and is preferably operated at a pressure of from about 100 to about 300 psi, with operation at the higher pressures in such ranges favoring heat transfer since an increase in pressure increases the unit volume heat capacity of the gas.

The partially activated or totally unactivated precursor composition is injected into the bed at a rate equal to its consumption at a point 13 which is above the distribution plate 8. Preferably, the precursor composition is injected at a point in the bed where good mixing of polymer particles occurs. Injecting the precursor composition at a point above the distribution plate is an important feature of this invention. Since the catalyst formed from such precursor composition is highly active, injection of the precursor composition into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots". Injection of the precursor composition into the reactor above the bed may result in excessive catalyst carryover into the recycle line where polymerization may begin and plugging of the line and heat exchanger may eventually occur.

A gas which is inert to the catalyst, such as nitrogen or argon, is used to carry the partially activated or totally unactivated precursor composition into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas entering the reactor is adjusted upwards and downwards to accommodate the change in rate of heat generation. This insures the maintenance of an essentially constant temperature in the bed. Complete instrumentation of both the fluidized bed and the recycle gas cooling system is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 14 at or close to the distribution plate 8 and in suspension with a portion of the gas stream which is vented as the particles settle to minimize further polymerization and sintering when the particles reach their ultimate collection zone. The suspending gas may also be used to drive the product of one reactor to another reactor.

The particulate polymer product is conveniently and preferably withdrawn through the sequential operation of a pair of timed valves 15 and 16 defining a segregation zone 17. While valve 16 is closed, valve 15 is opened to emit a plug of gas and product to the zone 17 between it and valve 15 which is then closed. Valve 16 is then opened to deliver the product to an external recovery zone. Valve 16 is then closed to await the next product recovery operation. The vented gas containing unreacted monomers may be recovered from zone 17 through line 18 and recompressed in compressor 19 and returned directly, or through a purified 20, over line 21 to gas recycle line 6 at a point upstream of the recycle compressor 9.

Finally, the fluidized bed reactor is equipped with an adequate venting system to allow venting the bed during start up and shut down. The reactor does not require the use of stirring means and/or wall scraping means. The recycle gas line 6 and the elements therein (compressor 8, heat exchanger 10) should be smooth surfaced, and devoid of unnecessary obstructions so as not to impede the flow of recycle gas.

The highly active catalyst systems of this invention yield a fluid bed product having an average particle size of from about 0.02 inches to about 0.05 inches, usually from about 0.02 inches to about 0.04 inches, in diameter wherein the catalyst residue is usually low. The polymer particles are relatively easy to fluidize in a bed.

The feed stream of gaseous monomers polymerizes to produce copolymer at a space time yield of about 2 to 10 pounds/hour/cubic foot of bed volume.

The term virgin resin or polymer as used herein means polymer, in granular form, as it is recovered from the polymerization reactor.

The following Examples are designed to illustrate the process of the present invention and are not intended as a limitation upon the scope thereof.

The properties of the polymers produced in the Examples were determined by the following test methods:

Density: ASTM D-1505—A plaque is made and conditioned for one hour at 100° C. to approach equilibrium crystallinity. Measurement for density is then made in a density gradient column and density values are reported as grams/cm$^3$.

Melt Index (MI): ASTM D-1238—Condition E—Measured at 190° C.—reported as grams per 10 minutes.

Flow Index (HLMI): ASTM D-1238—Condition F—Measured at 10 times the weight used in the melt index test above.

$$\text{Melt Flow Ratio (MFR)} = \frac{\text{Flow Index}}{\text{Melt Index}}$$

Productivity: A sample of the resin product is ashed, and the weight % of ash is determined; since the ash is essentially composed of the catalyst, the productivity is thus the pounds of polymer produced per pound of total catalyst consumed. The amount of Ti, Mg, and halide in the ash are determined by elemental analysis.

Bulk Density: ASTM D-1895—Method B. The resin is poured via ⅜″ diameter funnel into a 400 ml graduated cylinder to 400 ml line without shaking the cylinder, and weighed by difference.

Unsaturation: Infrared Spectrophotometer (Perkin Elmer Model 21). Pressings made from the resin which are 25 mils in thickness are used as test specimens. Absorbance is measured at 10.35$\mu$ for trans-vinyl unsaturation, 11.0$\mu$ for terminal vinyl unsaturation, and 11.25$\mu$ for vinylidene unsaturation. The absorbance per mil of thickness of the pressing is directly proportional to the product of unsaturation concentration and absorbtivity. Absorbtivities are taken from the literature values of R. J. De Kock, et al., J. Polymer Science, Part B, 2, 339 (1964).

Haze: ASTM D1003-61—Procedure B—Measured on a film sample 0.0015 inches thick using a recording spectrophotometer. This property is defined as the percentage of transmitted light which deviates more than 2.5° from a normal incident beam in passing through the specimen.

Gloss, 45° D: ASTM D2457-70—Measured on a film sample 0.0015 inches thick by means of a Gardner gloss meter, model UX-6. This property is defined as the relative luminous fractional reflectance of the specimen recorded on the receptor of the meter located at the mirror reflection of an incident beam directed at the specimen mounted on a dull background at an angle of 45° to the normal.

EXAMPLE 1

Impregnation of Support with Precursor

Two hundred and twenty-five kilograms (225 kg) of silica gel were dehydrated in a fluidized bed dehydrator at a temperature of 800° C. for 4 hours by passing dry, heated air through the gel at a superficial gas velocity equal to 3–10 times the minimum fluidization velocity. The heated silica gel was cooled to 300° C. with dry air, and then to room temperature with anhydrous nitrogen. Following this, the dry, cool silica was slurried with 1600 liters of isopentane under a nitrogen atmosphere, and the slurry was stirred while 189 liters of a 10 percent by weight solution of triethyl aluminum in anhydrous isopentane was added thereto over a ½ hour period. The resulting mixture, which contained 4 parts by weight of triethyl aluminum per 100 parts by weight of silica, was then stripped of isopentane by heating to a temperature of about 95° C. over a period of about 10 hours under a nitrogen atmosphere. A dry, free-flowing powder was recovered.

Three hundred and sixteen liters (316 l) of tetrahydrofuran and 15.7 kg of anhydrous MgCl$_2$ (164.3 mols) were placed in a mixing vessel, and the resulting mixture was stirred under a nitrogen atmosphere while 9.6 kg of TiCl$_4$ (50.6 mols) were added over a ½ hour period. The mixture was then heated at 55° C. for another ½ hour period in order to completely dissolve the material.

The tetrahydrofuran solution was then added under a nitrogen atmosphere to 64.5 kg of silica treated as described above, followed by an additional 45 liters of tetrahydforuan. The mixture was stirred for ½ hour while heating at a temperature of 55° C. At the end of this time, the mixture was stripped of tetrahydrofuran by heating to a temperature of 70° C. under a pressure of 6 psia while purging with nitrogen. About 75 kg of a dry, impregnated, free-flowing silica powder were recovered after about 15 hours.

EXAMPLE 2

Preparation of Partially Activated Precursor (a) Five hundred grams (500 g) of silica-impregnated precursor composition prepared in accordance with Example 1 was slurried in 3 liters of anhydrous isopentane and stirred while a 20 percent by weight solution of tri-n-hexyl aluminum in anhydrous hexane was added thereto over a ¼ hour period under a nitrogen atmosphere. The tri-n-hexyl aluminum solution was employed in an amount sufficient to provide 0.4 mols of aluminum per mol of tetrahydrofuran in the precursor. After addition of the tri-n-hexyl aluminum solution was completed, stirring was continued for an additional ¼ hour. The mixture was then stripped of solvent under a period of about 3 hours by heating to a temperature of 70° C. while purging with nitrogen. A dry, free-flowing powder was recovered which was stored under dry nitrogen until it was needed.

(b) The procedure was repeated employing the tri-n-hexyl aluminum solution in an amount sufficient to provide 0.6 mols of aluminum per mol of tetrahydrofuran in the precursor.

EXAMPLES 3–8

Ethylene was copolymerized with butene-1 in a series of six experiments employing the fluid bed reaction system described and illustrated herein. The polymerization reactor had a lower section 10 feet high and 13½ inches in diameter, and an upper section 16 feet high and 23½ inches in diameter.

Each of the polymerization reactions was conducted for 24 hours at 85° C. under a pressure of 300 psig, a gas velocity of 3 to 6 times $G_{mf}$, and a space time yield between 2 and 8. Hydrogen was introduced into the reactor in each instance as a chain transfer agent to control the molecular weight of the copolymers.

In the first two polymerizations (Example 3 and 4), silica-impregnated precursor composition prepared in accordance with Example 1, and partially activated in accordance with Example 2(a), was fed to the polymerization reactor along with a 5 percent by weight solution of triethyl aliminum in isopentane so as to provide completely activated catalysts in the reactor having aluminum:titanium molar ratios of 30:1 and 28:1, respectively.

In the next two polymerizations (Examples 5–6), the procedure was repeated employing both a dialkyl aluminum chloride and a trialkyl aluminum compound to complete activation of the precursor composition. Each activator compound was fed into the reactor separately as a dilute solution in isopentane. The two solutions were added in amounts and at a rate such as to maintain the molar ratio of the dialkyl aluminum chloride to trialkyl aluminum compound in the reactor at a fixed predetermined level and to provide completely activated catalysts in the reactor having aluminum:titanium molar ratios of 70:1.

In the next two polymerizations (Examples 7–8), the procedure of Examples 5–6 was repeated except that the silica-impregnated precursor composition employed was partially activated in accordance with Example 2(b), and the solutions of the dialkyl aluminum chloride and the trialkylaluminum compound were added in amounts and at a rate such as to provide completely activated catalysts in the reactor having aluminum:titanium molar ratios of 130:1 and 35:1, respectively.

Table I below summarizes the composition of the activator compound solutions employed in each example, including the specific dialkyl aluminum chloride and/or trialkyl aluminum compound employed, the molar ratio of the two compounds, and the concentration of the solutions in which they were employed. Also summarized in the table are the reaction conditions employed in each polymerization, the productivity of each catalyst system employed in terms of residual titanium and aluminum in the copolymer, the properties of the copolymers produced by these polymerizations, and the haze and gloss properties of films produced from such copolymers.

Haze and gloss determinations were made on 0.0015 inch thick film extruded through a 0.0060 inch die gap at a blow-up ratio of 3:1. The extruder was fitted with a 3 inch die and had a 1.5 inch diameter screw which was rotated at 50 rpm. Copolymer resin was fed to the extruder at a rate of about 25 pounds per hour. The frostline of the film was 9–11 inches.

As can be seen from the data presented in Table I, by activating the catalyst precursor with both a dialkyl aluminum halide and a trialkyl aluminum compound, it is possible to produce copolymers which can be extruded into films having improved haze and gloss properties. Generally, films blown from copolymers prepared in accordance with the present invention, when extruded under the conditions described above, have a haze value no greater than 16%, usually from 7% to 12%, and a 45° D specular gloss of at least 45, usually from 54 to 72. Such films have been found to have a gloss/haze ratio of at least 3, usually 5 to 10.

As is also apparent from Table I, the copolymers produced in accordance with the present invention have higher bulk densities than polymers produced employing only a single activator compound as in the prior art. Low bulk density is undesirable as it increases the cost of storing and shipping the copolymers. The bulk density of such copolymers ranges from about 19 to about 31 pounds per cubic foot.

TABLE I

| Example | 3 | 4 | 5 | 6 | 7 | 8 |
|---|---|---|---|---|---|---|
| Activator Compound | | | | | | |
| Dialkyl Aluminum Chloride (R₂AlCl) | — | — | (C₂H₅)₂AlCl | (i-C₄H₉)₂AlCl | (i-C₄H₉)₂AlCl | (i-C₄H₉)₂AlCl |
| Conc. of R₂AlCl Soln., Wt. % | — | — | 5.0 | 7.75 | 8.0 | 8.0 |
| Trialkyl Aluminum (R₃Al) | (C₂H₅)₃Al | (C₂H₅)₃Al | (C₂H₅)₃Al | (i-C₄H₉)₃Al | (i-C₄H₉)₃Al | (i-C₄H₉)₃Al |
| Conc. of R₃Al Soln., Wt. % | 5 | 5 | 0.5 | 1.0 | 2.0 | 0.5 |
| Molar Ratio R₂AlCl:R₃Al | — | — | 12.9 | 8.5 | 10.1 | 10.0 |
| Polymerization Conditions | | | | | | |
| Temperature, °C. | 85 | 85 | 85 | 85 | 85 | 85 |
| Pressure, psig | 300 | 300 | 300 | 300 | 300 | 300 |
| Gas Velocity, $G_{mf}$ | 3–6 | 3–6 | 3–6 | 3–6 | 3–6 | 3–6 |
| Space-Time Yield (lbs/hr/ft³) | 6.7 | 5.9 | 4.5 | 7.2 | 2.2 | 2.3 |
| Butene/Ethylene Mol Ratio | 0.42 | 0.42 | 0.42 | 0.42 | 0.44 | 0.50 |
| Hydrogen/Ethylene Mol Ratio | 0.21 | 0.20 | 0.28 | 0.27 | 0.32 | 0.41 |
| Productivity | | | | | | |
| ppm Ti in Copolymer | 5 | 3 | 2 | 2 | 2 | 10 |

TABLE I-continued

| Example | 3 | 4 | 5 | 6 | 7 | 8 |
|---|---|---|---|---|---|---|
| ppm Al in Copolymer | 84 | 47 | 78 | 78 | 148 | 197 |
| Polymer Properties | | | | | | |
| Melt Index, g/10 Min | 1.8 | 2.8 | 1.0 | 1.9 | 2.0 | 1.8 |
| Melt Flow Ratio | 26 | 27 | 24 | 24 | 24 | 23 |
| Density, g/cm$^3$ | 0.923 | 0.923 | 0.919 | 0.922 | 0.917 | 0.921 |
| Bulk Density, lbs/ft$^3$ | 18.7 | 16.8 | 22.9 | 20.7 | 25.0 | 24.5 |
| Film Properties | | | | | | |
| Gloss, 45° D | 13.3 | 27.3 | 54.1 | 48.6 | 72 | 71 |
| Haze, % | 44.0 | 27.7 | 10.5 | 13.5 | 8.8 | 7.4 |
| Gloss/Haze Ratio | 0.3 | 1.0 | 5.2 | 3.6 | 8.2 | 9.6 |

EXAMPLES 9-13

Ethylene was copolymerized with butene-1 in a series of five experiments employing the same fluid bed reaction system employed in Examples 3-8. The procedure employed in Examples 5-6 was repeated except that the dialkyl aluminum chloride and the trialkyl aluminum compound employed to complete activation of the precursor composition were dissolved in a single solution of isopentane and fed into the reactor together rather than separately. The solution was employed in amounts sufficient to provide completely activated catalysts in the reactor having aluminum:titanium molar ratios of 161:1 to 82:1.

Table II below summarizes the composition of the activator compound solution employed in each example, including the specific dialkyl aluminum chloride and trialkyl aluminum compound employed, the molar ratio of the two compounds, and the concentration of the two compounds in the solution. Also summarized in the table are the reaction conditions employed in each polymerization, the productivity of each catalyst system employed in terms of residual titanium and aluminum in the copolymer, the properties of the copolymers produced by these polymerizations, and the haze and gloss properties of films produced from such copolymers.

As can be seen from the data presented in Table II, in addition to being extrudable into films having improved haze and gloss properties, copolymers produced in accordance with the present invention are characterized by high bulk densities and low unsaturation. High unsaturation, it is believed, may contribute to poor film clarity. Generally, the copolymers prepared in accordance with the present invention have a terminal vinyl unsaturation no greater than 0.100 per 1000 carbon atoms, usually from 0.075 to 0.090 per 1000 carbon atoms; a trans-vinyl unsaturation no greater than 0.027 per 1000 carbon atoms, usually from 0.020 to 0.025 per 1000 carbon atoms; and a vinylidene unsaturation of no greater than 0.055 per 1000 carbon atoms, usually from 0.040 to 0.053 per 1000 carbon atoms.

On the other hand, copolymers prepared in a manner similar to Example 3 have been found to have a terminal vinyl unsaturation of 0.160 per 1000 carbon atoms, a trans-vinyl unsaturation of 0.034 per 1000 carbon atoms, and a vinylidene unsaturation of 0.064 per 1000 carbon atoms.

TABLE II

| Example | 9 | 10 | 11 | 12 | 13 |
|---|---|---|---|---|---|
| Activator Compound | | | | | |
| Dialkyl Aluminum Chloride (R$_2$AlCl) | (C$_2$H$_5$)$_2$AlCl | (C$_2$H$_5$)$_2$AlCl | (C$_2$H$_5$)$_2$AlCl | (C$_2$H$_5$)$_2$AlCl | (i-C$_4$H$_9$)$_2$AlCl |
| Conc. of R$_2$AlCl in Soln., Wt. % | 6.8 | 7.2 | 6.4 | 6.4 | 10.0 |
| Trialkyl Aluminum (R$_3$Al) | (C$_2$H$_5$)$_3$Al | (C$_2$H$_5$)$_3$Al | (C$_2$H$_5$)$_3$Al | (C$_2$H$_5$)$_3$Al | (C$_2$H$_5$)$_3$Al |
| Conc. of R$_3$Al in Soln., Wt. % | 0.8 | 0.2 | 0.9 | 0.9 | 0.8 |
| Molar Ratio R$_2$AlCl:R$_3$Al | 9.1 | 19.0 | 7.0 | 7.0 | 9.0 |
| Polymerization Conditions | | | | | |
| Temperature, °C. | 85 | 85 | 85 | 85 | 85 |
| Pressure, psig | 300 | 300 | 300 | 300 | 300 |
| Gas Velocity, G$_{mf}$ | 3-6 | 3-6 | 3-6 | 3-6 | 3-6 |
| Space-Time Yield (lbs/hr/ft$^3$) | 7.4 | 7.1 | 4.8 | 4.4 | 5.7 |
| Butene/Ethylene Mol Ratio | 0.47 | 0.42 | 0.46 | 0.45 | 0.45 |
| Hydrogen/Ethylene Mol Ratio | 0.40 | 0.41 | 0.37 | 0.36 | 0.37 |
| Productivity | | | | | |
| ppm Ti in Copolymer | 3 | 5 | 4 | 2 | 4 |
| ppm Al in Copolymer | 89 | 95 | 113 | 92 | 37 |
| Polymer Properties | | | | | |
| Melt Index, g/10 Min | 1.9 | 1.8 | 2.0 | 2.2 | 2.1 |
| Melt Flow Ratio | 24 | 22 | 25 | 23 | 23 |
| Density, g/cm$^3$ | 0.919 | 0.920 | 0.917 | 0.918 | 0.918 |
| Bulk Density, lbs/ft$^3$ | 24.2 | 24.1 | 26.1 | 24.7 | 25.1 |
| Unsaturation | | | | | |
| Terminal Vinyl | 0.078 | 0.077 | — | 0.087 | 0.087 |
| Trans-Vinyl | 0.022 | 0.020 | — | 0.024 | 0.023 |
| Vinylidene | 0.045 | 0.040 | — | 0.048 | 0.052 |
| Film Properties | | | | | |
| Gloss, 45° D | 53 | 61 | 70 | 67 | 55 |
| Haze, % | 15.1 | 10.5 | 9 | 10 | 12 |
| Gloss/Haze Ratio | 3.5 | 5.8 | 7.8 | 6.7 | 4.6 |

What is claimed is:

1. A continuous process for producing ethylene copolymers containing at least 90 mol percent of ethylene and no more than 10 mol percent of one or more alpha olefins containing from 3 to 8 carbon atoms, said copolymers being produced in granular form and having a density of from 0.91 g/cm³ to 0.94 g/cm³,
which comprises contacting a mixture of ethylene and at least one alpha olefin containing from 3 to 8 carbon atoms, at a temperature of from 30° C. to 105° C. and a pressure no greater than 1000 psi, in a gas phase reaction zone, with particles of a catalyst system comprising a precursor composition having the formula:

$$Mg_mTi(OR)_nX_p[ED]_q$$

wherein R is an aliphatic or aromatic hydrocarbon radical containing from 1 to 14 carbon atoms, or COR' wherein R' is an aliphatic or aromatic hydrocarbon radical containing from 1 to 14 carbon atoms,
X is selected from the group consisting of Cl, Br, I, and mixtures thereof,
ED is an organic electron donor compound selected from the group consisting of alkyl esters of aliphatic and aromatic carboxylic acids, aliphatic ethers, cyclic ethers and aliphatic ketones,
m is 0.5 to 56,
n is 0, 1 or 2,
p is 2 to 116, and
q is 2 to 85,
said precursor composition being diluted with an inert carrier material, and being completely activated in the reaction zone with a mixture of a dihydrocarbyl aluminum halide compound and a trihydrocarbyl aluminum compounded wherein the molar ratio of dihydrocarbyl aluminum halide compound to trihydrocarbyl aluminum compound is maintained at from 4:1 to 20:1, said dihydrocarbyl aluminum halide compound and said trihydrocarbyl aluminum compound being employed in an amount such as to provide a total aluminum:titanium molar ratio in said reaction zone of from 10:1 to 400:1,
said dihydrocarbyl aluminum halide compound having the formula:

$$R''_2AlX$$

wherein R'' is a saturated hydrocarbon radical containing from 1 to 14 carbon atoms or OR''', wherein R''' is a saturated hydrocarbon radical containing from 1 to 14 carbon atoms,
and said trihydrocarbyl aluminum compound having the formula:

$$R'''_3Al$$

wherein R''' is a saturated hydrocarbon radical containing from 1 to 14 carbon atoms, and
X is selected from the group consisting of Cl, Br, I, and mixtures thereof.

2. A process as in claim 1 wherein said precursor composition is mechanically mixed with the inert carrier material and the blended mixture contains from 3 percent by weight to 50 percent by weight of the precursor composition.

3. A process as in claim 1 wherein the inert carrier material is impregnated with the precursor composition and the impregnated carrier material contains from 3 percent by weight to 50 percent by weight of the precursor composition.

4. A process as in claim 1, 2 or 3 wherein the inert carrier material is silica.

5. A process as in claim 4 wherein X is Cl, [ED] is tetrahydrofuran, n is 0, m is 1.5 to 5, p is 6 to 14, and q is 3 to 10.

6. A process as in claim 5 wherein R'' and R''' are saturated hydrocarbon radicals containing from 1 to 14 carbon atoms.

7. A process as in claim 6 wherein the dihydrocarbyl aluminum halide compound is selected from the group consisting of diethyl aluminum chloride and diisobutyl aluminum chloride, and the trihydrocarbyl aluminum compound is selected from the group consisting of triethyl aluminum and triisobutyl aluminum.

8. A process as in claim 5 wherein the molar ratio of dihydrocarbyl aluminum halide compound to trihydrocarbyl aluminum compound is maintained at from 5:1 to 15:1, and said dihydrocarbyl aluminum halide compound and said trihydrocarbyl aluminum compound are employed in an amount such as to provide a total aluminum:titanium molar ratio in the reaction zone of from 25:1 to 60:1.

9. A process as in claim 8 wherein R'' and R''' are saturated hydrocarbon radicals containing from 1 to 14 carbon atoms.

10. A process as in claim 9 wherein the dihydrocarbyl aluminum halide compound is selected from the group consisting of diethyl aluminum chloride and diisobutyl aluminum chloride, and the trihydrocarbyl aluminum compound is selected from the group consisting of triethyl aluminum and triisobutyl aluminum.

11. A process as in claim 1, 2 or 3 wherein the precursor composition is partially activated with an organo aluminum activator compound before it is introduced into the reaction zone so as to provide the precursor composition with a molar ratio of activator compound:electron donor of up to 1.4:1, said activator compound having the formula:

$$Al(R'')_dX'_eH_f$$

wherein X' is Cl or OR''', R'' and R''' are saturated hydrocarbon radicals containing from 1 to 14 carbon atoms, e is 0 to 1.5, f is 0 or 1, and d+e+f=3.

12. A process as in claim 11 wherein the inert carrier material is silica.

13. A process as in claim 12 wherein X and X' are Cl, [ED] is tetrahydrofuran, n is 0, m is 1.5 to 5, p is 6 to 14, and q is 3 to 10.

14. A process as in claim 13 wherein R'' and R''' and saturated hydrocarbon radicals containing from 1 to 14 carbon atoms.

15. A process as in claim 14 wherein the dihydrocarbyl aluminum halide compound is selected from the group consisting of diethyl aluminum chloride and diisobutyl aluminum chloride, and the trihydrocarbyl aluminum compound is selected from the group consisting of triethyl aluminum and triisobutyl aluminum.

16. A process as in claim 13 wherein the molar ratio of dihydrocarbyl aluminum halide compound to trihydrocarbyl aluminum compound is maintained at from 5:1 to 15:1, and said dihydrocarbyl aluminum halide compound and said trihydrocarbyl aluminum compound are employed in an amount such as to provide a total aluminum:titanium molar ratio in the reaction zone of from 25:1 to 60:1.

17. A process as in claim 16 wherein R″ and R‴ are saturated hydrocarbon radicals containing from 1 to 14 carbon atoms.

18. A process as in claim 17 wherein the dihydrocarbyl aluminum halide compound is selected from the group consisting of diethyl aluminum chloride and diisobutyl aluminum chloride, and the trihydrocarbyl aluminum compound is selected from the group consisting of triethyl aluminum and triisobutyl aluminum.

* * * * *

UNITED STATES PATENT AND TRADEMARK OFFICE
CERTIFICATE OF CORRECTION

PATENT NO. : 4,349,648
DATED : September 14, 1982
INVENTOR(S) : Robert James Jorgensen et al.

It is certified that error appears in the above—identified patent and that said Letters Patent is hereby corrected as shown below:

Column 3, line 22, after "per" insert - - 1000 - -.

Column 5, line 11, the period (.) after "thereof" should be a comma (,).

Column 8, line 5, "fluidized" should read - - fluidizing - -.

Column 10, line 1, "as" should read - - are - -.

Column 11, line 14, "purified" should read - - purifier - -.

Column 12, line 56, "tetrahydforuan" should read - - tetrahydrofuran - -.

Column 13, line 10, "under" should read - - over - -.

Column 15, line 27, "161.1" should read - - 16:1 - -.

Column 17, line 35, "compounded" should read - - compound - -.

Signed and Sealed this

Twenty-eighth Day of June 1983

[SEAL]

Attest:

GERALD J. MOSSINGHOFF

Attesting Officer

Commissioner of Patents and Trademarks